(12) United States Patent
Black

(10) Patent No.: US 7,040,708 B2
(45) Date of Patent: May 9, 2006

(54) VEHICLE SEAT

(75) Inventor: David Richmond Black, Petone (NZ)

(73) Assignee: Racetech Manufacturing Ltd., Petone (NZ)

( * ) Notice: Subject to any disclaimer, the term of this patent is extended or adjusted under 35 U.S.C. 154(b) by 0 days.

(21) Appl. No.: 10/872,783

(22) Filed: Oct. 4, 2004

(65) Prior Publication Data

US 2005/0093360 A1    May 5, 2005

Related U.S. Application Data

(63) Continuation-in-part of application No. 29/193,123, filed on Nov. 5, 2003.

(51) Int. Cl.
*A47C 7/02* (2006.01)
(52) U.S. Cl. .............................. 297/452.34; 297/452.36
(58) Field of Classification Search .......... 297/452.33, 297/452.34, 452.35, 452.36
See application file for complete search history.

(56) References Cited

U.S. PATENT DOCUMENTS

| | | | |
|---|---|---|---|
| 3,165,355 A * | 1/1965 | Hitchcock, Jr. et al. ................. | 297/452.36 X |
| 3,627,379 A | 12/1971 | Eberhard | |
| 4,679,854 A | 7/1987 | Putsh | |
| 5,048,894 A * | 9/1991 | Miyajima et al. ...... | 297/452.35 |
| 5,513,897 A | 5/1996 | Lemmen | |
| 6,027,171 A * | 2/2000 | Partington et al. ..... | 297/452.33 |
| 6,102,481 A * | 8/2000 | Tateyama .......... | 297/452.35 X |
| 2002/0038966 A1 | 4/2002 | Doehrer | |

OTHER PUBLICATIONS

U.S. Appl. No. 29/193,123, filed Nov. 2003, Black.

* cited by examiner

*Primary Examiner*—Anthony D. Barfield
(74) *Attorney, Agent, or Firm*—NIxon & Vanderhye P.C.

(57) ABSTRACT

A vehicle seat has shoulder restraints extending forward from a backrest. The shoulder restraints may extend forward of a seated occupant's shoulder, providing effective restraint of lateral movement. The seat may also include head and thigh restraints and a beam running horizontally across the backrest. The beam stiffens the backrest and may also stiffen the shoulder restraints or provide attachment points for fixing the seat to a vehicle roll cage.

23 Claims, 3 Drawing Sheets

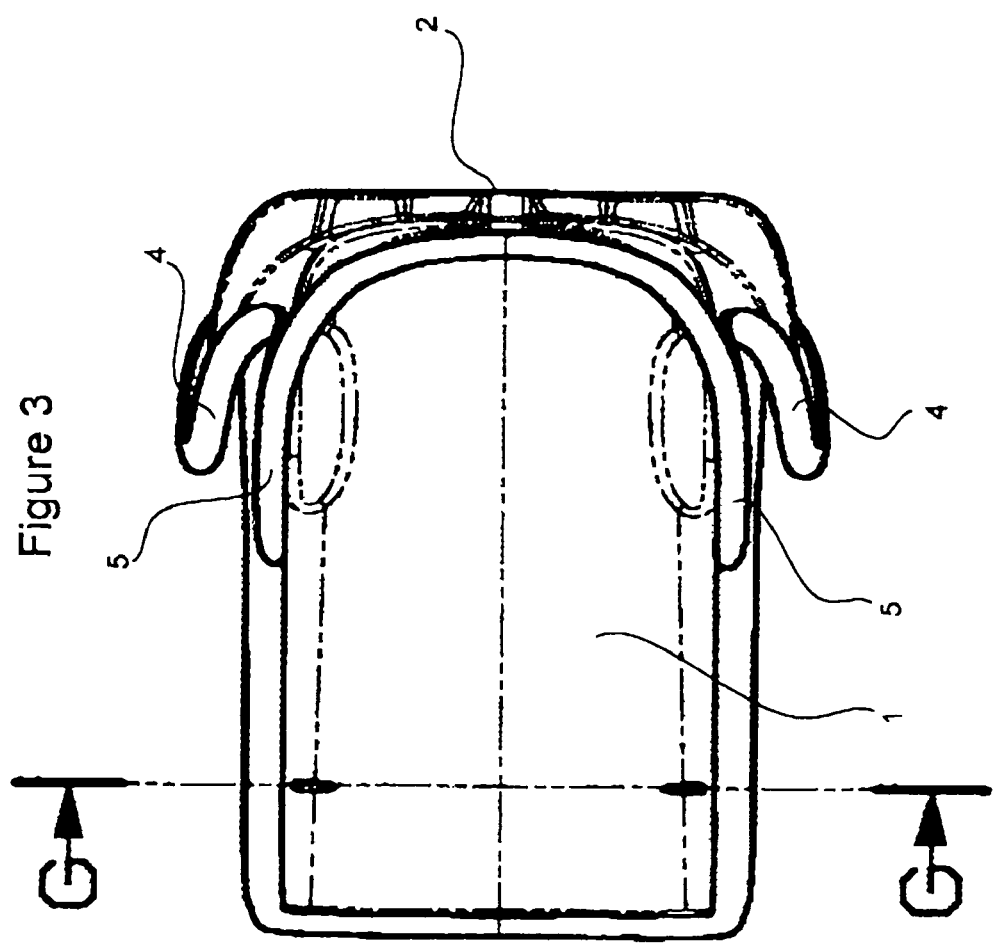

VEHICLE SEAT

This application is a continuation-in-part of U.S. Design application Ser. No. 29/193,123 filed Nov. 5, 2003. The entire contents of this application is incorporated herein by reference.

FIELD OF THE INVENTION

The invention relates to vehicle seats. In particular, the invention relates to seats for racing cars.

BACKGROUND OF THE INVENTION

Mass market vehicle seats generally include padded upholstery around a framework. The frameworks are generally complicated, allowing for adjustment of the seat. Such vehicle seats are usually not adapted to resist large lateral forces on an occupant of the seat, or to be fixed to a vehicle roll cage.

In vehicle seats for racing cars that, weight is very important. This makes complex framework undesirable. Also, users of seats in motor sports are likely to experience large lateral forces because of cornering at high speeds, loss of control of the vehicle or collisions.

Vehicle seats with forwardly extending side portions are known. Generally these side portions extend only a short distance from the seat's backrest and so do not effectively restrain lateral movement of the driver. One such seat is described in U.S. Pat. No. 3,627,379. This seat includes triangular side portions that are widest at the top, formed from a tubular framework. As shown in FIG. 3, the side portions are padded to a laterally sloping shape, such that the ability of the seat to resist lateral forces on the driver is not strong. Furthermore, this structure is comparatively complicated and heavy. A similar seat is described in U.S. Pat. No. 4,679,854. Again the "side restraints" do not extend far from the seat back.

U.S. Pat. No. 5,513,897 discloses a vehicle seat with a lateral head restraint. Again, this seat is a complicated structure. The seat does not provide lateral support other than around the head. US 2002/0038966 describes a safety seat with head protection members but not shoulder restraints.

SUMMARY OF THE INVENTION

It is an object of the invention to provide a vehicle seat with effective restraint of lateral movement of an occupant in the shoulder region.

It is also an object of the invention to provide a vehicle seat with effective restraint of lateral movement of an occupant in the shoulder and head region.

It is also an object of the invention to provide a vehicle seat with effective restraint of lateral movement of an occupant in the thigh, shoulder and head region.

It is also an object of the invention to provide a vehicle seat with improved means of fixing the seat to a vehicle and particularly to a vehicle roll cage.

In a first aspect the invention provides a vehicle seat having:
a base and a backrest, and
shoulder restraints extending forward from the backrest, wherein the shoulder restraints, in use, extend forward beyond the shoulder of a seated occupant and are adapted to restrain lateral movement of the seated occupant in the occupant's shoulder region.

In a second aspect the invention provides a vehicle seat having:
a base and a backrest, and
a beam formed integrally with the backrest and extending substantially horizontally across the backrest at about shoulder height of a seated occupant.

In a third aspect the invention provides a vehicle seat having:
a base and a backrest, and
a beam extending substantially horizontally across the backrest and including one or more fixture means adapted for fixing the seat to one or more structural members of a vehicle.

In a fourth aspect the invention provides a vehicle seat having:
a base;
a backrest;
shoulder restraints extending forward from the backrest; and
head restraints extending forward from the backrest;
wherein the shoulder restraints are adapted, in use, to restrain lateral movement of a seated occupant in the occupant's shoulder region and the head restraints are adapted, in use, to restrain lateral movement of the seated occupant's head.

BRIEF DESCRIPTION OF THE DRAWINGS

The invention will now be described by way of example with reference to the accompanying drawings, in which:

FIG. 3 is a top view of the seat of FIG. 1;
FIG. 4 is a first cross-section of the seat of FIG. 1.

DESCRIPTION OF THE INVENTION

Figure 1:
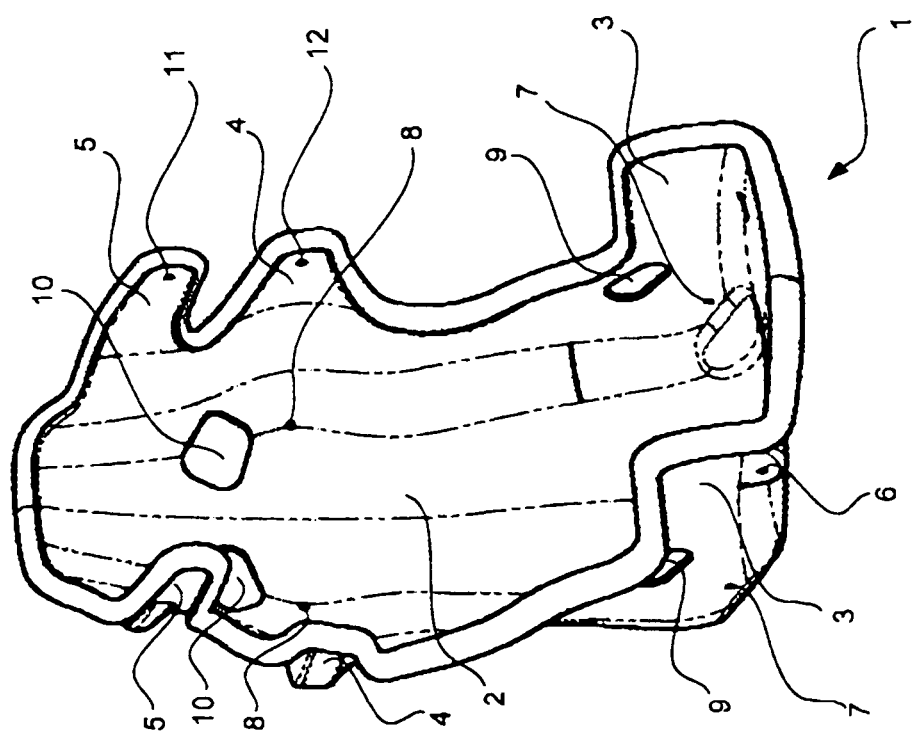
FIG. 1 is a front perspective view of a seat according to the invention.

FIG. 1 is a front perspective view of a vehicle seat according to the invention. The seat includes a base 1 and a backrest 2. The base 1 includes thigh restraints 3 that extend upwardly from the base and restrain lateral movement of an occupant of the seat in the thigh region. Preferably the thigh restraints extend generally perpendicularly to the base.

Shoulder restraints 4 extend forward from the backrest 2 and restrain lateral movement of the occupant in the shoulder region. Preferably the shoulder restraints extend generally perpendicular to the backrest and extend forward of the shoulder of a seated occupant, to effectively restrain lateral movement of the seated occupant.

Head restraints 5 extend forward from the backrest 2 and restrain lateral movement of the occupant's head. Preferably the head restraints extend approximately perpendicular to the backrest.

The seat includes a number of fixture points 6, 7, 8 for fixing the seat to structural members of a vehicle framework. In particular, fixture points 8 are adapted for fixing the seat to a roll cage or other structural member of a vehicle. Preferably the seat also includes fixture points 11, 12 near the ends of the head and shoulders restraints. These fixture points 11, 12 may be fixed to the structure of the vehicle, or may be used to fix guide points for webbing type nets, for example.

The seat includes apertures 9, 10 for allowing passage of a safety harness to restrain movement of the occupant in the event of a crash.

Preferably the seat comprises an integrally formed shell with padding, upholstery, coverings etc applied thereto. The outer edge of the shell is rolled to the outside along its perimeter, providing a strong, smooth edge.

Figure 2:
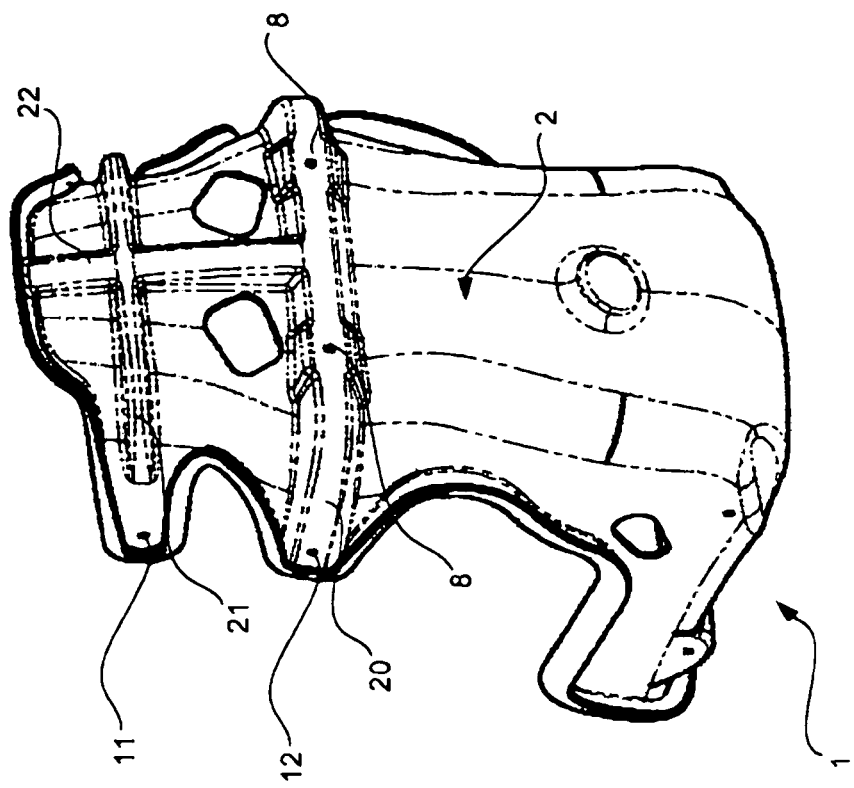
FIG. 2 is a rear perspective view of the seat of FIG. 1.

FIG. 2 is a rear perspective view of the seat of FIG. 1. The seat includes a beam 20 that extends horizontally across the backrest 2. The beam serves to strengthen the backrest and preferably extends forward along the shoulder restraints 4. The beam 20 also provides fixture points 8 adapted for fixing the seat to a vehicle roll cage or the like. Preferably the beam 20 is formed integrally with the backrest 2.

A second beam 21 may also be provided, extending horizontally across the backrest and extending forward along the head restraints. This beam may be linked with the beam 20 by a vertical beam 22. The beams 20, 21, 22 may be formed in a single piece and may be formed integrally with the backrest. The assembly of beams 20, 21, 22 gives greater strength to the upper part of the backrest and especially to the shoulder restraints 4 and head restraints 5.

FIG. 3 shows a top view of the seat of FIG. 1, showing the head restraints 5 and shoulder restraints 4 extending forward from the backrest 2. FIG. 4 is a cross-section through the seat, along the line G—G in FIG. 3.

Figure 6:
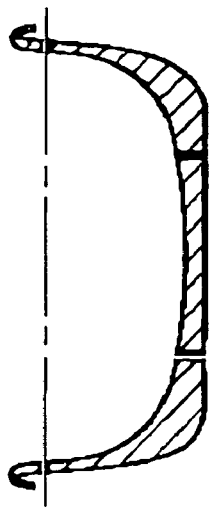
FIG. 6 is a second cross-section of the seat of FIG. 1.
Figure 7:
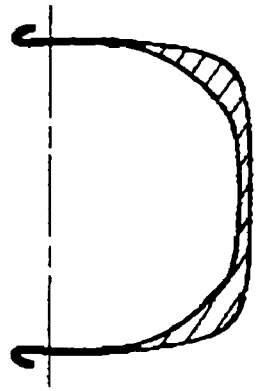
FIG. 7 is a third cross-section of the seat of FIG. 1.
Figure 5:
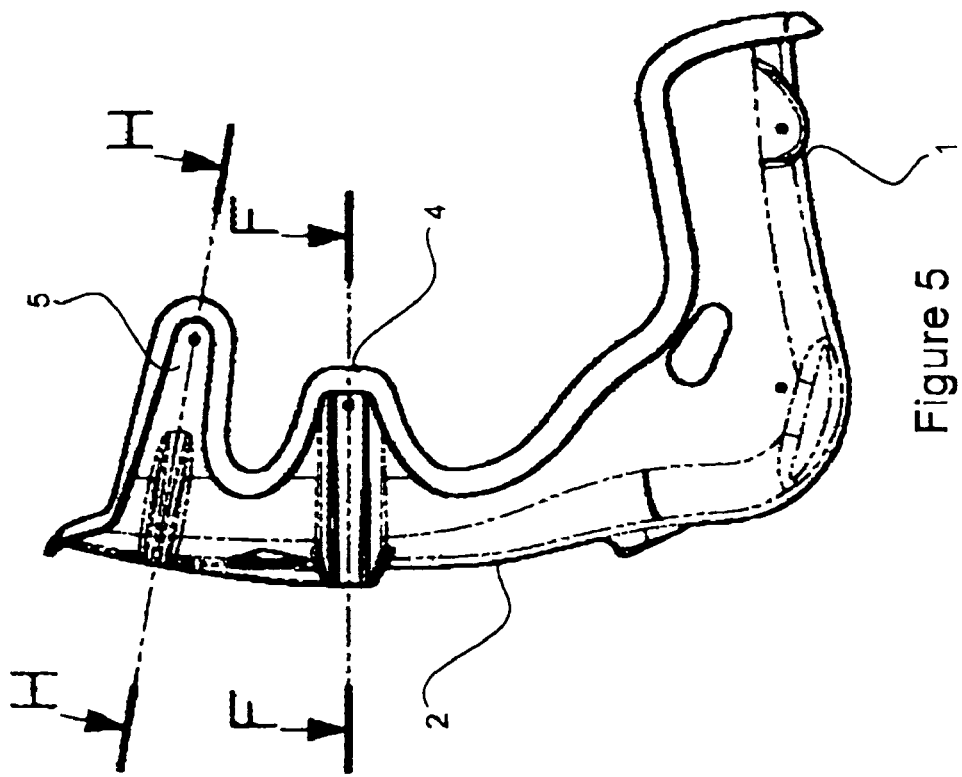
FIG. 5 is a side view of the seat of FIG. 1.

FIG. 5 is a side view of the vehicle seat. FIG. 6 is a cross-section through the shoulder restraints 4, along the line F—F in FIG. 5 showing the profile of beam 20. FIG. 7 is a cross-section through the head restraints 5, along the line H—H in FIG. 5 showing the profile of beam 21.

The invention provides a vehicle seat that provides effective restraint of lateral movement of a seated occupant in the shoulder region. The seat may also restrain the occupant in the head and thigh regions. As the seat is preferably integrally formed with one or more beams across the backrest, it is lightweight and strong. The seat is also more firmly fixed to the vehicle structure than prior seats. This leads to greater safety, but also allows a lighter seat with a less comprehensive framework.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the. Applicant's general inventive concept.

The invention claimed is:

1. A vehicle seat having:
a base and a backrest,
shoulder restraints extending forward from the backrest; and
a beam extending substantially across the backrest and forward along the shoulder restraints, the beam including one or more fixture points to fix the seat to one or more structural members of a vehicle,
wherein the shoulder restraints, in use, extend forward beyond the shoulder of a seated occupant and are adapted to restrain lateral movement of the seated occupant in the occupant's shoulder region.

2. A vehicle seat as claimed in claim 1, wherein the base includes a seat portion and thigh restraints extending upwardly at the sides of the seat portion and wherein the thigh restraints are adapted to, in use, restrain lateral movement of the seated occupant in the occupant's thigh region.

3. A vehicle seat as claimed in claim 1, wherein the beam is formed integrally with the backrest and is structured to extend substantially horizontally across the backrest at about shoulder height of a seated occupant.

4. A vehicle seat as claimed in claim 1, wherein the base, backrest and shoulder restraints are formed integrally.

5. A vehicle seat as claimed in claim 1, wherein the base, backrest, shoulder restraints and beam are formed integrally.

6. A vehicle seat as claimed in claim 1, including head restraints extending forward from the backrest; wherein the head restraints are adapted, in use, to restrain lateral movement of a seated occupant's head.

7. A vehicle seat as claimed in claim 6, wherein the base, backrest, shoulder restraints and head restraints are formed integrally.

8. A vehicle seat as claimed in claim 6 further including a second beam extending substantially horizontally across the backrest and forward along part of the head restraints.

9. A vehicle seat as claimed in claim 8 wherein each shoulder restraint includes a fixture point.

10. A vehicle seat as claimed in claim 9 wherein each head restraint includes a fixture point.

11. A vehicle seat as claimed in claim 10 wherein the fixture point in each of the shoulder restraints and head restraints is located near an end thereof.

12. A vehicle seat as claimed in claim 6 wherein each head restraint and each shoulder restraint includes a fixture point.

13. A vehicle seat as claimed in claim 12 wherein the part of the beam which extends across the backrest has at least one fixture point.

14. A vehicle seat as claimed in claim 11 wherein a vertically orientated beam extending along the backrest links said beam and the second beam.

15. The vehicle seat as claimed in claim 1, wherein the one or more structural members include a roll cage.

16. A vehicle seat having:
a base;
a backrest;
shoulder restraints extending forward from the backrest;
head restraints extending forward from the backrest;
a first beam extending substantially horizontally across the backrest and forward along the shoulder restraints; and
one or more fixture points to fix the seat to one or more structural members of a vehicle,
wherein the shoulder restraints are adapted, in use, to restrain lateral movement of a seated occupant in the occupant's shoulder region and the head restraints are adapted, in use, to restrain lateral movement of the seated occupant's head.

17. A vehicle seat as claimed in claim 16 further including a second beam extending substantially horizontally across the backrest and forward along part of the head restraints.

18. A vehicle seat as claimed in claim 17 further including a vertical beam extending along the backrest and linking the first and second beams.

19. A vehicle seat as claimed in claim 16 wherein each shoulder restraint includes a fixture point.

20. A vehicle seat as claimed in claim 19 wherein the shoulder restraint fixture point is located near an end of the shoulder restraint.

21. A vehicle seat as claimed in claim 20 wherein each head restraint includes a fixture point for fixing the head restraint to one or more structural members of a vehicle.

22. A vehicle seat as claimed in claim 19 wherein the part of the beam which extends across the backrest includes one or more fixture points.

23. A vehicle seat as claimed in claim 21 wherein the part of the first beam which extends across the backrest includes one or more fixture points.

* * * * *